(12) United States Patent
Conti et al.

(10) Patent No.: US 9,522,399 B2
(45) Date of Patent: Dec. 20, 2016

(54) FOOD PROCESSOR AND ADJUSTABLE CUTTING ASSEMBLY

(71) Applicant: Whirlpool Corporation, Benton Harbor, MI (US)

(72) Inventors: Michael P. Conti, Saint Joseph, MI (US); Thomas Gillette, Stevensville, MI (US); David J. Gushwa, Mishawaka, IN (US); Duane M. Kobos, Laporte, IN (US); Anthony Roberts, Granger, IN (US); Nicholas Stuart, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 493 days.

(21) Appl. No.: 13/784,987

(22) Filed: Mar. 5, 2013

(65) Prior Publication Data
US 2014/0061344 A1    Mar. 6, 2014

Related U.S. Application Data

(60) Provisional application No. 61/608,943, filed on Mar. 9, 2012.

(51) Int. Cl.
| | | |
|---|---|---|
| *B02C 7/14* | (2006.01) | |
| *A47J 43/07* | (2006.01) | |
| *A47J 43/25* | (2006.01) | |

(52) U.S. Cl.
CPC .............. *B02C 7/14* (2013.01); *A47J 43/0722* (2013.01); *A47J 43/255* (2013.01)

(58) Field of Classification Search
CPC .. A47J 43/0722; A47J 43/255; A47J 43/0716; B02C 18/12; B26D 1/29; B26D 7/2628
(Continued)

(56) References Cited

U.S. PATENT DOCUMENTS 4,199,112 A * 4/1980 McLean ........................ 241/92
4,560,111 A * 12/1985 Cavalli ........................ 241/92
(Continued)

FOREIGN PATENT DOCUMENTS

| EP | 2225981 A2 | 8/2010 |
|---|---|---|
| EP | 2382902 A1 | 2/2011 |
| GB | 2430141 A | 3/2007 |

OTHER PUBLICATIONS

European Patent Application No. 13158210.8, filed Mar. 7, 2013, Applicant: Whirlpool Corporation. EP search regarding same with a mail date of Jun. 26, 2013.

*Primary Examiner* — Faye Francis
*Assistant Examiner* — Onekki Jolly

(57) ABSTRACT

A food processor includes a bowl with a removable lid. Food items are advanced into the bowl through a feed tube formed in the lid where they are cut by a cutting assembly. The cutting assembly is positionable between a plurality of cutting positions to produce cut food items of varying thicknesses. The food processor includes an adjustment assembly operable to move the cutting assembly between the plurality of cutting positions. The adjustment assembly includes a user-operated control device that is secured to the cutting assembly. The user-operated control device extends through a slot defined in the removable lid such that an upper end of the user-operated control device is positioned outside of the processing chamber.

18 Claims, 12 Drawing Sheets

(58) Field of Classification Search
USPC ............... 241/36, 91, 92, 277, 278.1, 282.1,
282.2,241/286
See application file for complete search history.

(56) References Cited

U.S. PATENT DOCUMENTS

| | | |
|---|---|---|
| 7,635,101 B1 | 12/2009 | Mah et al. |
| 2003/0094522 A1 | 5/2003 | Cordiero |
| 2006/0163396 A1* | 7/2006 | Kennedy et al. ............... 241/92 |
| 2007/0095959 A1* | 5/2007 | Narai et al. ................... 241/92 |
| 2008/0115677 A1* | 5/2008 | Tseng et al. ................... 99/510 |
| 2008/0202355 A1* | 8/2008 | Krall et al. .................... 99/513 |
| 2009/0139383 A1* | 6/2009 | Tsai ............................... 83/490 |
| 2009/0301319 A1* | 12/2009 | Bigge et al. ................... 99/538 |

* cited by examiner

FOOD PROCESSOR AND ADJUSTABLE CUTTING ASSEMBLY

CROSS-REFERENCE TO RELATED APPLICATIONS

The present application claims priority to U.S. Provisional Patent Application Ser. No. 61/608,943 entitled "Food Processor and Adjustable Cutting Assembly for Use with Same" filed Mar. 9, 2012, pending.

TECHNICAL FIELD

The present disclosure relates generally to a domestic food processing device, and, more particularly, to an adjustable cutting assembly for a food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collect in the bottom of the bowl. Some food processors also include an outlet on the bowl that guides the processed pieces of food into an outside bin, container, or other bowl.

Food processors typically come equipped with a number of interchangeable cutting tools for slicing, shredding, or other food processing operations. One common cutting tool is a rotating disk-type cutter. Such a cutting tool may include a rotating disk having a cutting blade fixed thereto. The cutting blade is secured to the rotating disk at a location adjacent to an aperture formed in the disk so that food items cut by the blade fall through the aperture. Another rotating disk-type cutting tool may include a rotating disk with a plurality of cutting teeth formed thereon for shredding food items. Each cutting tooth is positioned over an aperture formed in the disk so that food items cut by the tooth fall through the aperture.

SUMMARY

According to one aspect of the disclosure, a cutting assembly for a food processing device is disclosed. The cutting assembly includes a planar disk having an upper surface, and at least one cutting tooth that extend through at least one slot defined in the planar disk. However, it is contemplated that the planar disk may be configured with a plurality of cutting teeth that extend through a plurality of slots defined in the planar disk. Each cutting tooth has a cutting edge that defines an opening in the cutting tooth. The cutting edge of each cutting tooth has a tip positioned above the upper surface of the planar disk, a distance is defined between the upper surface of the planar disk and the tip, and the planar disk is movable between a plurality of positions to adjust the distance to produce cut food items of varying thicknesses.

The cutting edge of each cutting tooth may include a first section extending downwardly from the tip to define a first side of the opening and a second section extending downwardly from the tip to define a second side of the opening. The opening of each cutting tooth may be a trapezoidal-shaped opening, a rectangular-shaped opening, but is not limited to a specific shape. The shape may have straight or curved surfaces that are predetermined by the desired shape of the cut food.

The cutting assembly may include a support disk positioned substantially parallel to and at least one of above and below the planar disk. The support disk may have the plurality of cutting teeth extending upwardly therefrom. In some embodiments, each cutting tooth may have an inner wall that extends inwardly from the opening to define a channel extending downwardly through the support disk. Additionally, the cutting teeth may be arranged in a number of staggered or offset rows. Each staggered or offset row of the cutting teeth may be positioned along a radial line extending outwardly from the center of the support disk.

The support disk may be removably coupled to the planar disk. Additionally, the cutting assembly may further include a hub secured to the planar disk. The hub may have a base and a platform formed at an upper end of the base. The support disk may be positioned between the platform of the hub and the planar disk.

Further, each slot may have at least one of, but is not limited to an oval shaped, a circular shaped, a rectangular shaped or an oblong-shaped opening in the upper surface of the planar disk.

According to another aspect, a food processing device is disclosed. The food processing device may include a base having a motor positioned therein, a removable bowl coupled to the base, and a removable lid coupled to the bowl so as to define a processing chamber. The lid may include a feed tube that opens into the bowl. The food processing device may also include a cutting assembly positioned in the processing chamber and driven by the motor to cut food items advanced through the feed tube. The cutting assembly includes at least one cutting tooth having a tip. However, merely by way of example, a plurality of cutting teeth, each cutting tooth having a tip will be discussed in greater detail below. The cutting assembly may also include a planar disk having an upper surface. The planar disk is upwardly and downwardly moveable relative to the cutting teeth to adjust a predefined distance between each tip of the cutting teeth and the upper surface of the planar disk to produce food items of varying thicknesses and ultimately varying shapes depending on a non-linear shape of the cutting teeth. Additionally, the food processing device may include an adjustment assembly having a lever extending outwardly from the base. The lever is operable to move the planar disk relative to the cutting teeth while the cutting assembly is driven by the motor.

At least one cutting tooth may extend through at least one slot defined in the planar disk. However, merely by way of example, a plurality of cutting teeth extending through a plurality of slots defined in the planar disk will be discussed in greater detail below. Each cutting tooth may have a cutting edge that defines an opening in the cutting tooth. In some embodiments, the cutting assembly may also include a support disk positioned below the planar disk. The support disk may have the plurality of cutting teeth extending upwardly therefrom.

The food processing device may further include a drive stem coupled to an output shaft of the motor and the support disk. The food processing device may further include an adaptor removably coupled to the planar disk. The adjustment assembly may further include a screw-type drive assembly coupled to the adaptor and the lever. Movement of the lever in a first direction may cause the screw-type drive assembly to move the planar disk downward relative to the cutting teeth, and movement of the lever in a second direction may cause the screw-type drive assembly to move the planar disk upward relative to the cutting teeth.

According to another aspect, the food processing device may include a base having a motor positioned therein, a removable bowl coupled to the base, and a removable lid coupled to the bowl so as to define a processing chamber. The lid has a feed tube that opens into the bowl. A cutting assembly is positioned in the processing chamber and driven by the motor to cut food items advanced through the feed tube. The cutting assembly includes a planar disk having an upper surface and a support disk positioned below the planar disk. The support disk has a plurality of cutting teeth extending upwardly through the planar disk. The food processing device also includes an adjustment assembly coupled to the cutting assembly. The adjustment assembly includes a user-operated control device positioned outside of the processing chamber. Each cutting tooth has a tip positioned above the upper surface of the planar disk, one of the support disk and the planar disk is moveable to adjust a predefined distance between each tip of the cutting teeth and the upper surface of the planar disk to produce food items of varying thicknesses and shapes, and the user-operated control device is operable to move the one of the support disk and the planar disk while the cutting assembly is driven by the motor.

The user-operated control device may be a lever extending outwardly from the base. The lever may be operable to move the support disk while the cutting assembly is driven by the motor.

The cutting teeth may extend through a plurality of slots defined in the planar disk, and each cutting tooth may have a cutting edge that defines an opening in the cutting tooth.

The processing chamber may have an upper compartment and a lower compartment, and each cutting tooth has an inner wall that extends inwardly from the opening to define a channel extending downwardly through the support disk to advance food items cut by the cutting tooth from the upper compartment to the lower compartment.

The opening of each cutting tooth may be at least one of an arcuate-shaped and trapezoidal-shaped opening. However, it is contemplated that other geometrical shapes or a combination of shapes such as a cutting tooth having a trapezoidal-shaped opening with arcuate sidewalls is also discussed.

BRIEF DESCRIPTION OF THE DRAWINGS

The detailed description particularly refers to the following figures, in which.

DETAILED DESCRIPTION OF THE DRAWINGS

Figure 1:
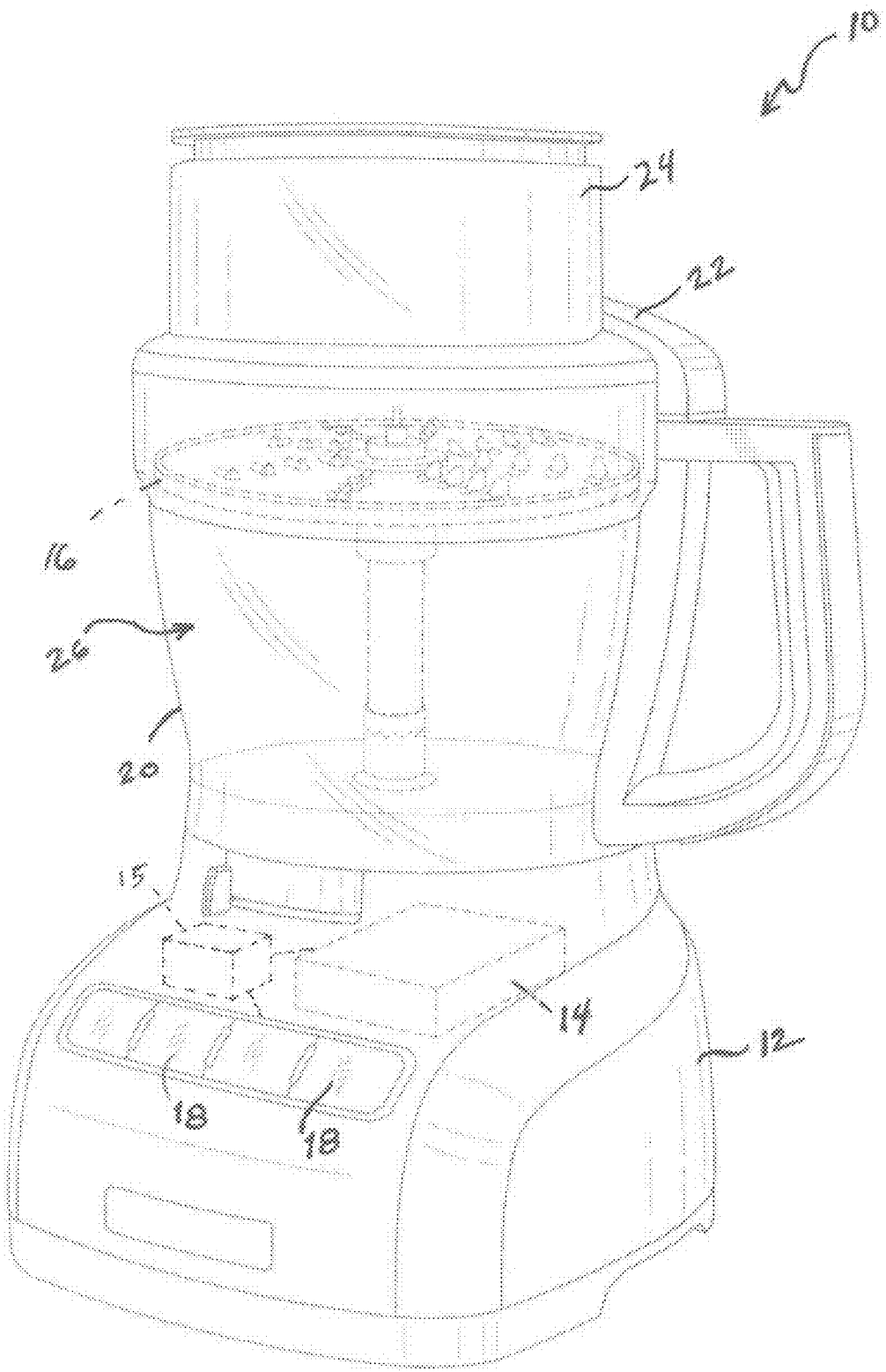
FIG. 1 is a perspective view of a food processing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIG. 1, a food processing device or food processor 10 is shown. The food processor 10 has a base 12 that houses a motor 14 and a control unit 15. Under the control of the control unit 15, the motor 14 drives an adjustable cutting tool 16 to cut food items such as cheeses, meats, fruits, and vegetables. The base 12 also includes one or more buttons, switches, dials, or other types of controls 18 in communication with the control unit 15. A user operates the controls 18 to control the operation of the motor 14 and hence the food processor 10. For example, one of the controls 18 may be operable to turn the motor 14 on and off while another control 18 may change the motor's speed.

As will be understood by those skilled in the art, the control unit 15 may comprise at least one of analog and/or digital circuitry to process electrical signals received from the motor 14 (or other components of the food processor 10) and provide electrical control signals to the motor or other components of the food processor 10. For example, the control unit 15 may be embodied as a microcontroller that executes firmware routines to control the operation of the food processor 10.

A removable receptacle or bowl 20 is secured to the base 12. The bowl's handle facilitates placement of the bowl 20 on the base 12. The bowl 20 includes a removable lid 22 secured to its upper peripheral edge. The lid 22 has a feed tube 24 formed thereon through which food items such as, for example, fruits, vegetables, and so forth are inserted into the bowl 20 to be processed by the food processor 10.

Collectively, the lid 22 and the bowl 20 define a processing chamber 26 where food items are processed by the cutting tool 16.

The bowl 20, the lid 22, and the feed tube 24 are generally made of, but are not limited to a transparent or translucent plastic material so that the contents of the food processor 10 can be viewed by a user without removing the lid 22 from the bowl 20. Moreover, one or more locking mechanisms may be used to lock the bowl to the base 12 and the lid 22 to the bowl 20.

Figure 11:
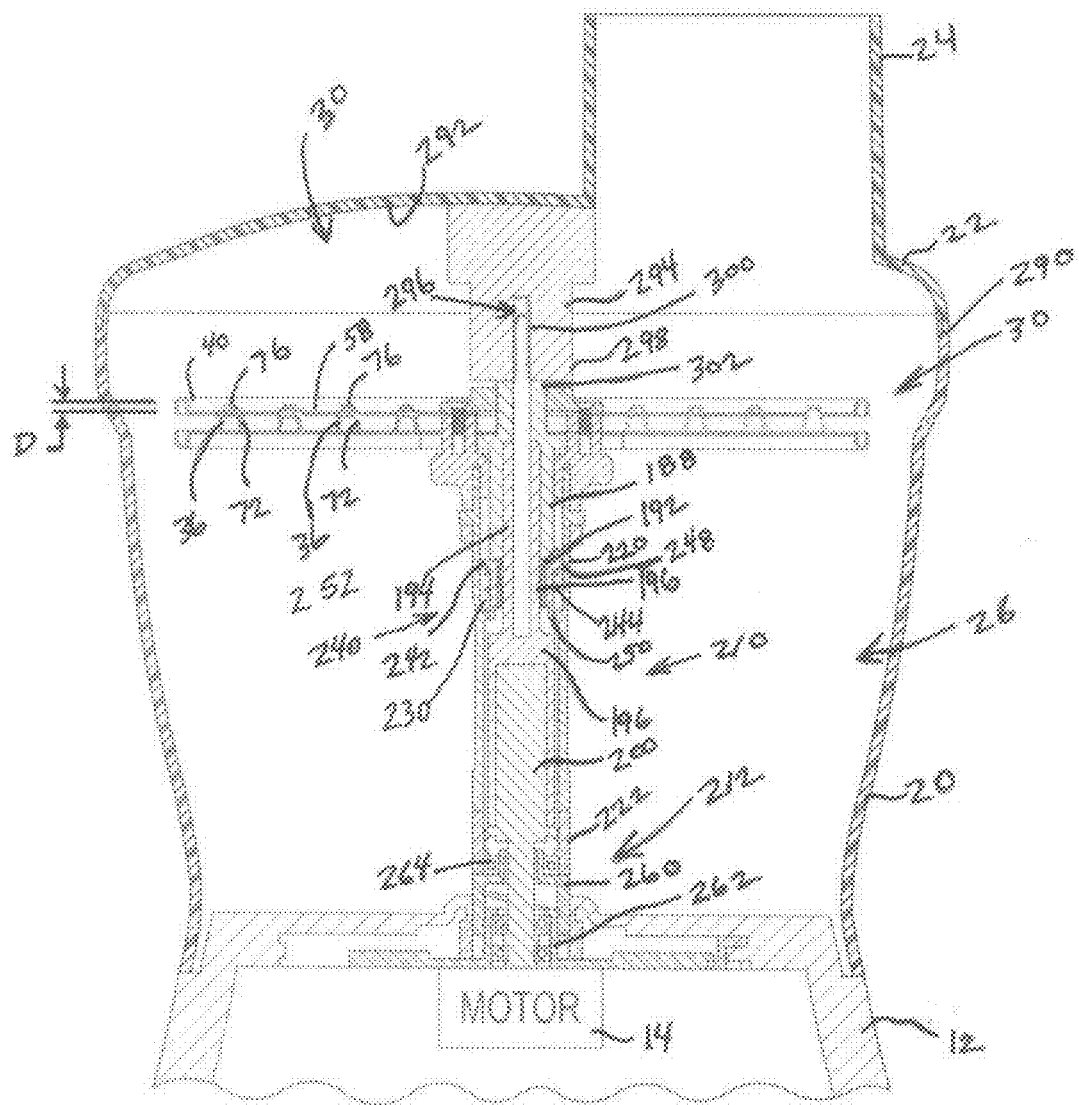
FIG. 11 is a partial cross-sectional view of the food processing device of FIG. 1 showing the adjustable cutting tool of FIG. 2 in one cutting position.
Figure 12:
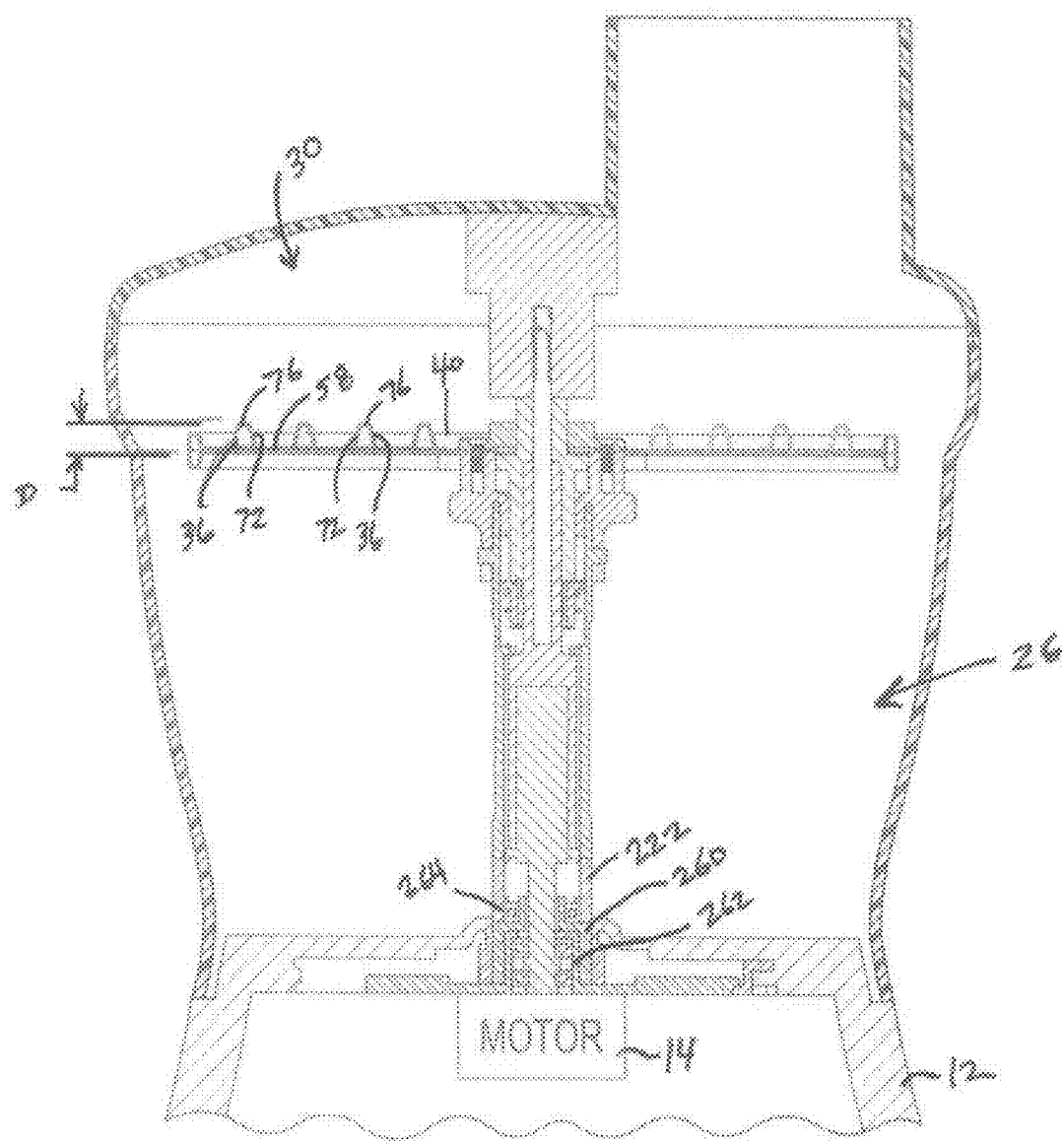
FIG. 12 is a view similar to FIG. 11 showing the adjustable cutting tool of FIG. 2 in another cutting position.

Referring now to FIGS. 2-7, the adjustable cutting tool 16 is illustrated as an adjustable cutting disk assembly 30 includes cutters that may be used to make shredding or grating cuts. Alternatively, the disk assembly 30 may include cutters for making julienne, french fry, ice, or other style cuts. The assembly 30 may include an upper plate 32, a lower plate 34 including a plurality of cutting teeth 36, and a central hub 38. The upper plate 32 may include a carrier disk 40 having substantially planar body 42 extending radially outward from a central bore 44 defined in the carrier disk 40 to a circular outer perimeter 46. The carrier disk 40 may also have a rim 48 that extends vertically from the outer perimeter 46 of the body 42. The carrier disk 40 may have a diameter that is slightly less than the inner diameter of the bowl 20. As such, the rim 48 is positioned adjacent to, but is spaced slightly apart from, the inner wall of the bowl 20 to permit the rotation of the assembly 30 within the bowl 20, as shown in FIGS. 11 and 12. It should be appreciated that the rim 48 may be omitted.

A plurality of slots 50 are defined in the carrier disk 40, and the cutting teeth 36 of the lower plate 34 are positioned in the slots 50. As described in greater detail below, the slots 50 and the cutting teeth 36 of the disk 40 collectively define a region 52 of the carrier disk 40 (see FIG. 4) in which food items may be cut by the cutting tool 16.

As illustrated, the slots 50 are arranged in a number of staggered rows 54 that extend radially outward from the central bore 44. The slots may be arranged in a number of configurations of curved rows that sweep forward or backward. The slots may be dispersed asymmetrically over the planar disk. As shown in FIGS. 2-7, each slot 50 has an oblong-shaped opening 56 defined in an upper surface 58 of the carrier disk 40. As described in greater detail below, the openings 56 are sized to receive the cutting teeth 36 of the lower plate 34. It should be appreciated that each opening may be rectangular, oval, or other geometric-shape sized to receive one of the cutting teeth 36 of the lower plate 34 and is not limited to a specific size or shape.

Figure 2:
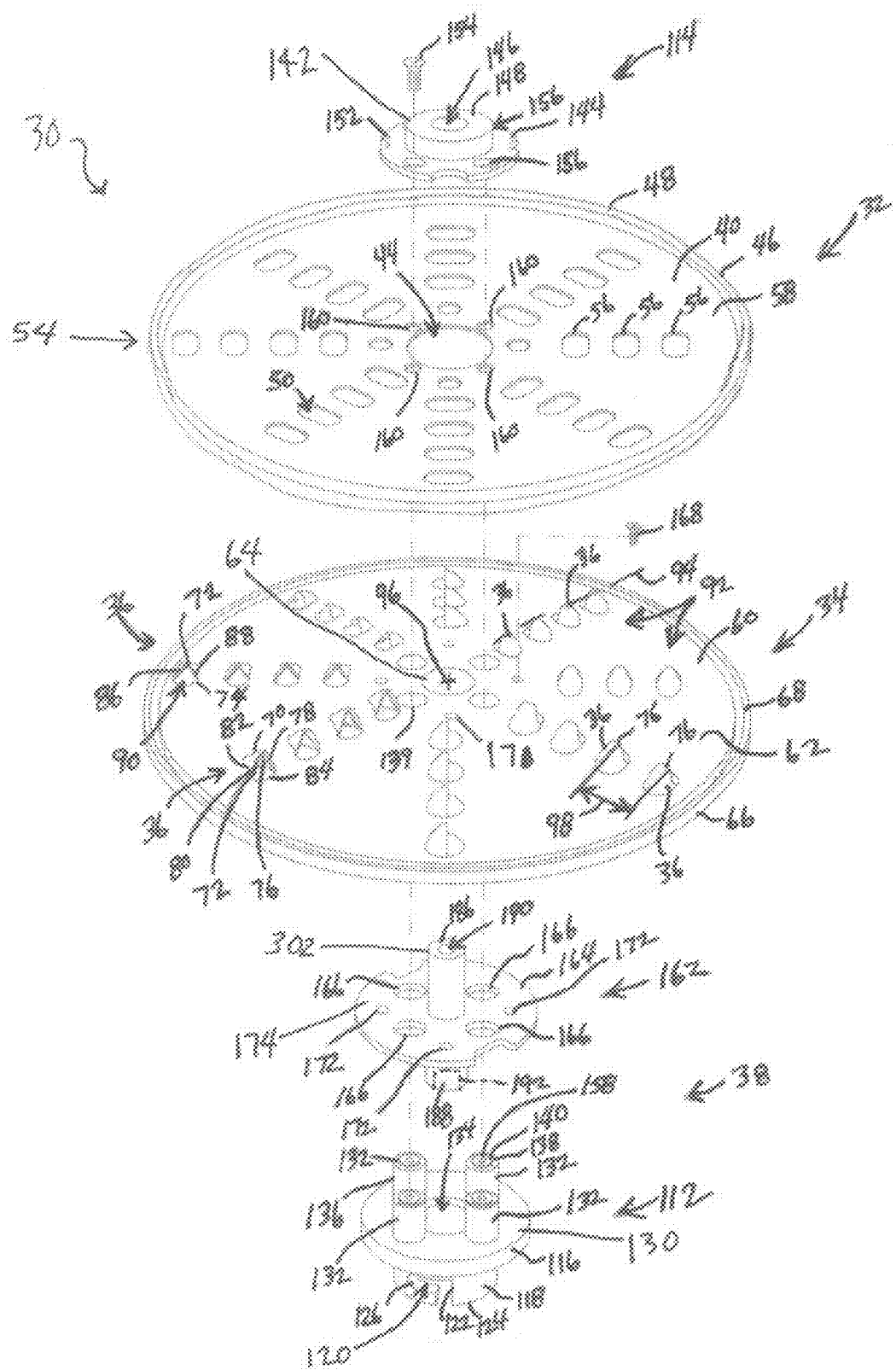
FIG. 2 is an exploded perspective view of one embodiment of an adjustable cutting tool of the food processing device of FIG. 1.
Figure 3:
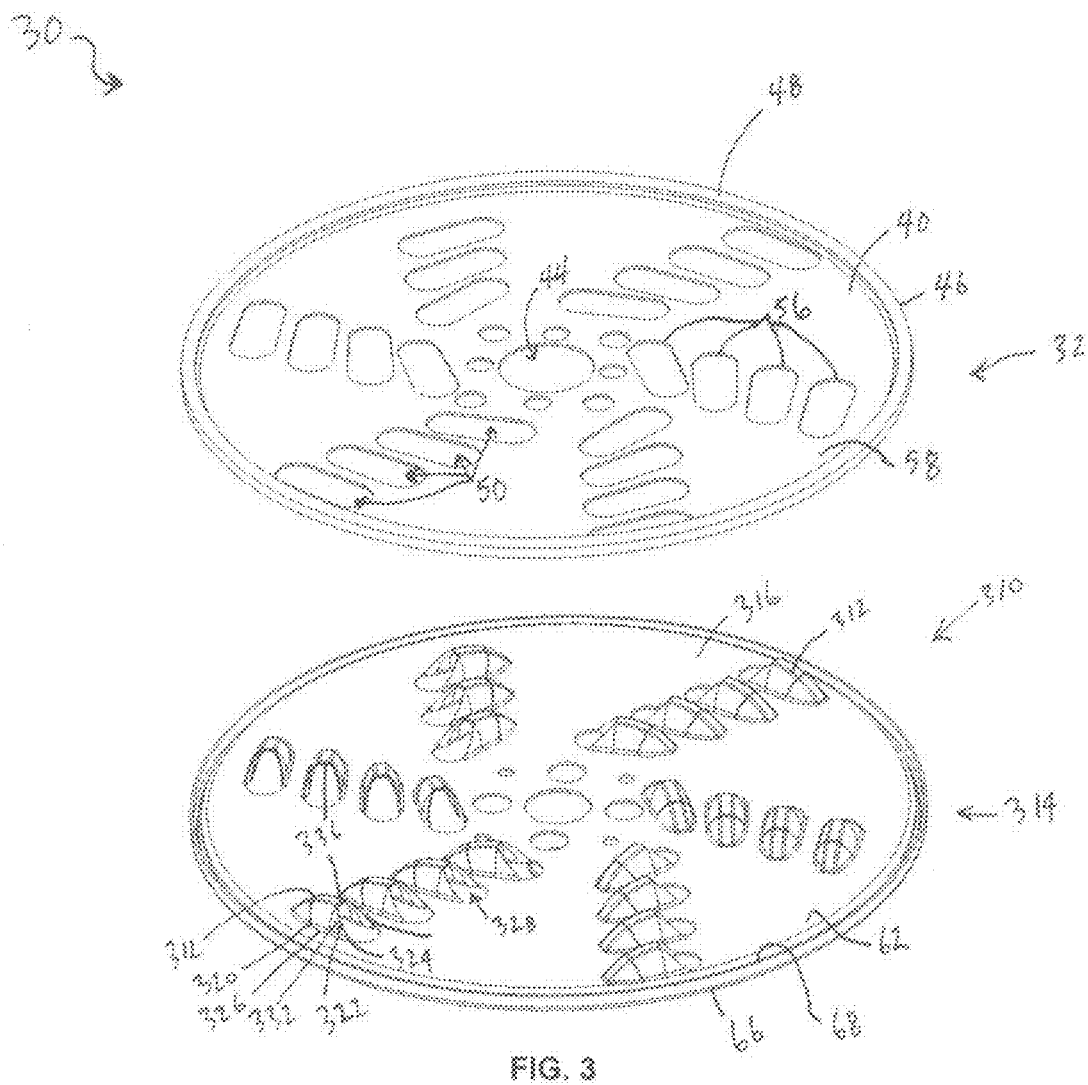
FIG. 3 is a partial exploded perspective view of an alternative adjustable cutting tool of the food processing device of FIG. 1.

As shown in FIGS. 2 and 3, the lower plate 34 of the assembly 30 is positioned below the upper plate 32. The lower plate 34 includes a support disk 60 having a substantially planar body 62 that extends radially outward from a central bore 64 defined in the disk 60 to a circular outer perimeter 66. The support disk 60 also has a rim 68 that extends vertically from the outer perimeter 66 of the body 62. The support disk 60 has a diameter that is slightly less than the inner diameter of the bowl 20. As such, the rim 68, like the rim 48 of the carrier disk 40, is positioned adjacent to, but is spaced slightly apart from, the inner wall of the bowl 20 to permit the rotation of the assembly 30 within the bowl 20. It should be appreciated that the rim 68 may be omitted.

Figure 8A:
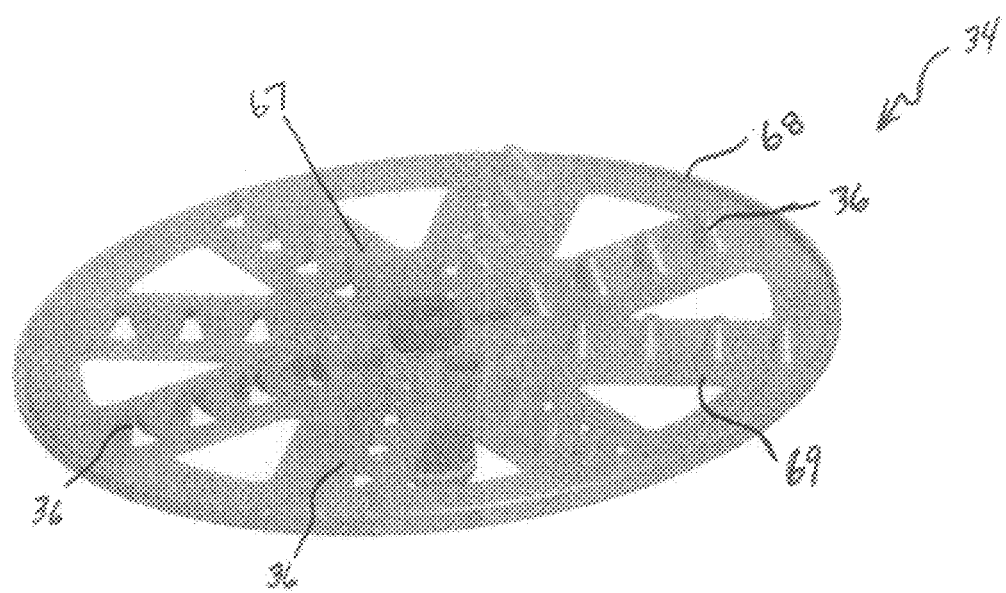
FIG. 8*a* is a perspective view of another embodiment of a lower plate for the adjustable cutting tool of FIG. 1.
Figure 8B:
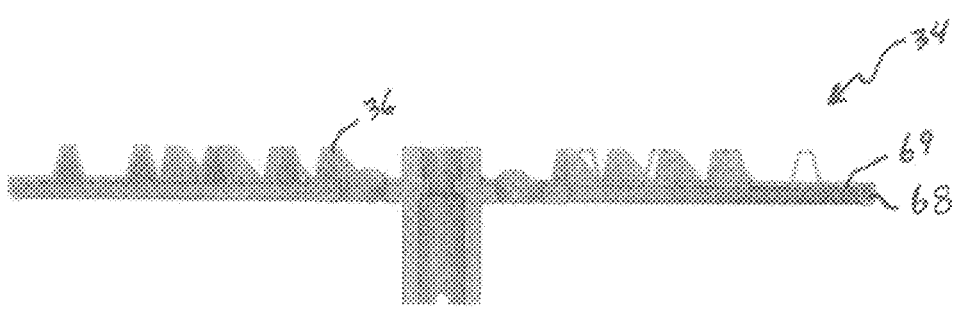
FIG. 8*b* is a cross-sectional side elevation view of the lower plate of FIG. 8*a;*

The lower plate 34 also includes the plurality of cutting teeth 36, which extend upwardly from the support disk 60. As illustrated, the support disk 60 is embodied as a monolithic structure formed from a metallic material, such as, but not limited to, steel, and the cutting teeth 36 are formed by a metal stamping operation. However, it should be appreciated that the components of the support disk 60 (e.g., the teeth 36, the body 62, the rim 68) may be embodied as separate components secured to one another by an adhesive or other suitable fastener. For example, one or more cutting teeth 36 may be included on a frame that is removably coupled to the support disk. As shown in FIGS. 8A and 8B, the planar body 62 of the lower plate 34 may be modified or replaced with, for example, a support frame 67 having a plurality of arms 69 connected to the rim 68. The cutting teeth 36 are arranged along each arm 69 and extend upwardly therefrom.

Figure 4:
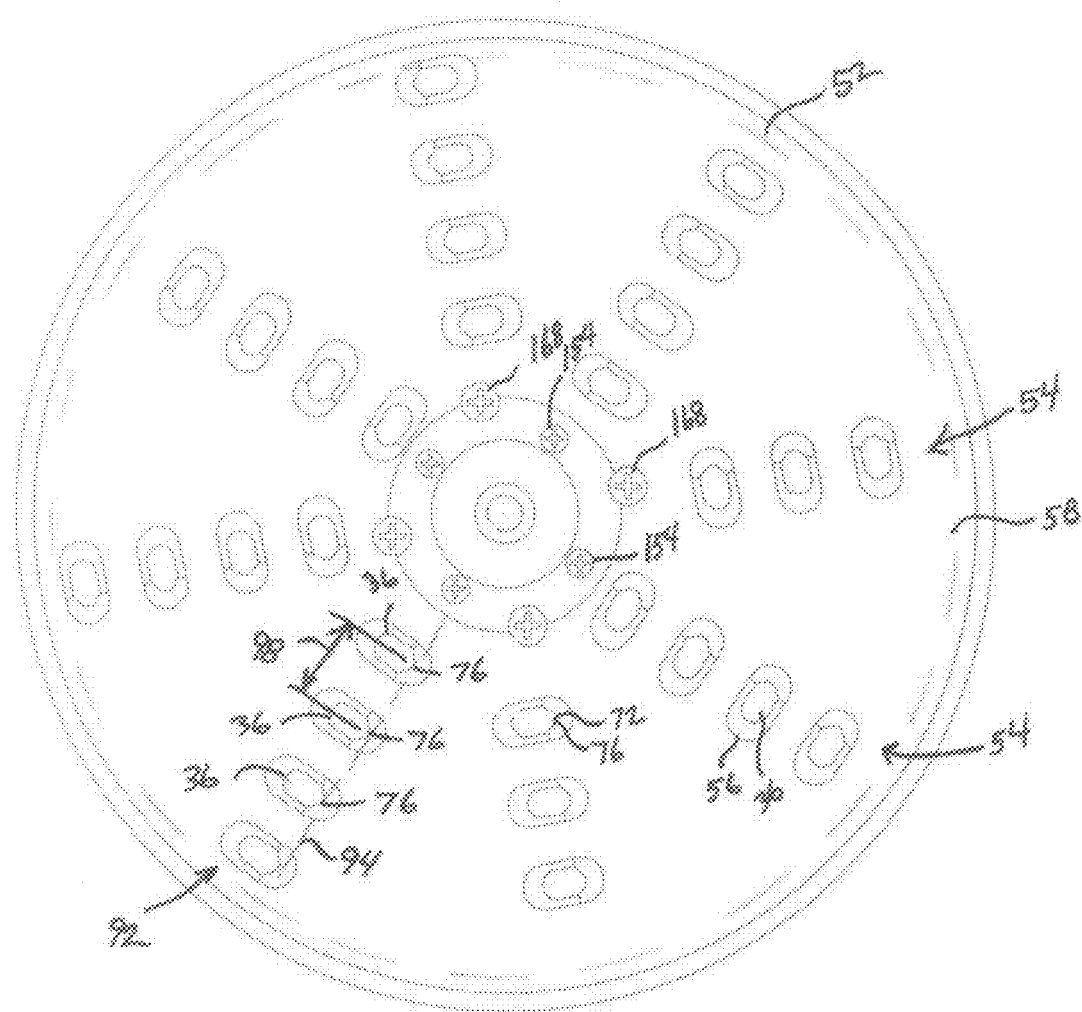
FIG. 4 is a top plan view of an adjustable cutting tool of FIG. 2.

As shown in FIG. 2, the cutting teeth 36 correspond to the slots 50 defined in the upper plate 32 such that one tooth 36 is positioned in each slot 50. Each cutting tooth 36 of the lower plate 34 includes a shell 70 and a cutting edge 72 that is formed on a side 74 of the shell 70. The cutting edge 72 has a top edge 76, which is positioned above the upper surface 58 of the upper plate 32, and a pair of side sections 78, 80 that extend downwardly from the top edge 76 to a base 82 of the cutting tooth 36. As illustrated in FIGS. 2-4, the side sections 78, 80 and the shell 70 may an angular or arcuate geometric shape depending on the desired cut of the article being processed. The base 82 of each tooth 36 is attached to the planar body 62 of the disk 60 and partially encloses a slot 84 extending through the planar body 62.

The cutting edge 72 of each tooth 36 defines an opening 86 in the side 74 of the shell 70. As illustrated, the opening 86 is a trapezoidal-shaped opening. Alternatively, the opening may be curved or bowed, rectangular, triangular, or other geometric shape. An inner wall 88 extends inwardly from the opening 86 to define a channel 90 in each shell 70. The channel 90 extends downwardly through slot 84 defined in the planar body 62 such that food items cut by the tooth 36 are advanced downward, as described in greater detail below. The channel 90 is inclined or sloped such that food is guided from the upper surface 58 of the carrier disk 40, through the support disk 60, and out the slot 84. The magnitude of the angle or slope of the channel 90 is selected such that the cut food items are guided smoothly out of the slot 84.

As shown in FIG. 2, the cutting teeth 36 are arranged in a number of staggered rows 92 that correspond to the staggered rows 54 defined in the upper plate 32. Each staggered row 92 may positioned along a radial line 94 extending outwardly from the center 96 of the body 62 of the support disk 60. Alternatively, each staggered row 92 may be offset from the staggered line in varying patterns and angles as illustrated in FIGS. 3 and 4. Within each row 92, a gap 98 is defined between the top edges 76 of adjacent teeth 36. As illustrated, the magnitude of each gap 98 is substantially equal such that the teeth 36 in each row 92 are at least one of equally and variably spaced apart in a predefined pattern. Alternatively, the teeth may be arranged in a number of curved rows that sweep forward or backward. Additionally, the teeth may be dispersed asymmetrically over the support disk. The gaps defined between the top edges 76 of adjacent cutting teeth 36 may be different or asymmetrical so that no gap is equal to any other gap.

Referring specifically to FIGS. 3 and 5-7, an alternative lower plate (hereinafter lower plate 310) including an alternative set of cutting teeth 312 is illustrated. The lower plate 310 may be used in place of the lower plate 34 described above in reference to FIGS. 2 and 4. The lower plate 310, like the lower plate 34, includes a support disk 314 having a substantially planar body 62 that extends radially outward from a central bore 64 defined in the disk 314 to a circular outer perimeter 66. The support disk 314 also has a rim 68 that extends vertically from the outer perimeter 66 of the body 62. The support disk 314 has a diameter that is slightly less than the inner diameter of the bowl 20. As such, the rim 68, like the rim 48 of the carrier disk 40, is positioned adjacent to, but is spaced slightly apart from, the inner wall of the bowl 20 to permit the rotation of the assembly 30 within the bowl 20. It should be appreciated that in other embodiments the rim 68 may be omitted.

Figure 5:
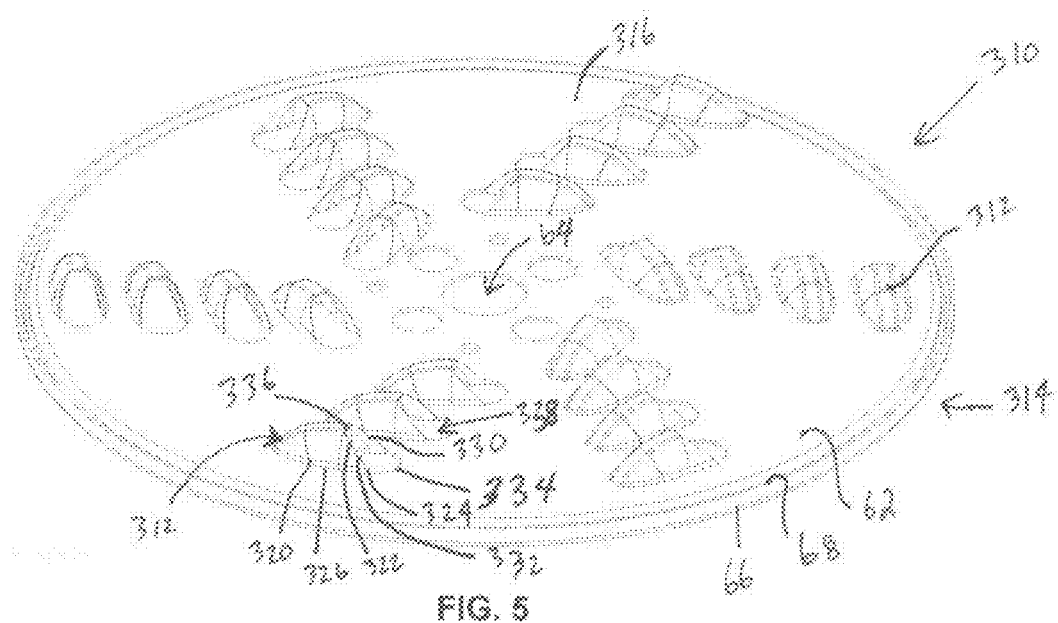
FIG. 5 is a perspective view of an alternative lower plate for the adjustable cutting tool of FIG. 1.

As shown in FIGS. 3 and 5, the plurality of cutting teeth 312 extend upwardly from the support disk 314. The cutting teeth 312 correspond to the slots 50 defined in the upper plate 32 such that one tooth 312 is positioned in each slot 50. Each cutting tooth 312 of the lower plate 310 includes a shell 320 and a cutting edge 322 that is formed on a side 324 of the shell 320. Each cutting tooth 312 has a base 326 that is attached the planar body 62 of the disk 314 and partially encloses a slot 328 extending through the planar body 62. The cutting edge 322 has a pair of sloped side sections 330, 332 that extend rearwardly from a forward end 334 of the slot 328 to a tip 336 of the cutting edge 322. The tip 336 is positioned above the upper surface 58 of the carrier disk 40.

Figure 7:
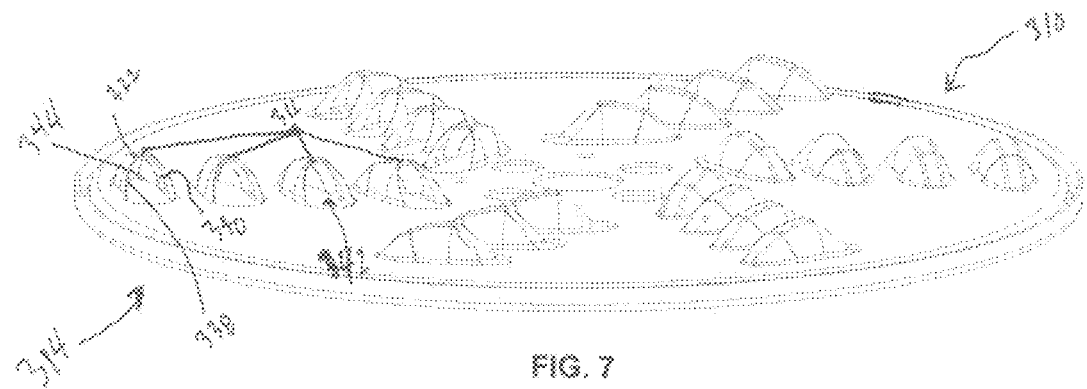
FIG. 7 is a side elevation view of the lower plate of FIG. 5.

The cutting edge 322 of each tooth 312 defines an opening 338 in the side 324 of the shell 320, as shown in FIG. 7. In the illustrative embodiment, the opening 338 is a trapezoidal-shaped opening. In other embodiments, the opening may be curved or bowed, rectangular, triangular, or other geometric shape. An inner wall 340 extends inwardly from the opening 338 to define a channel 342 in each shell 320. The channel 342 extends downwardly through the slot 328 defined in the planar body 62 such that food items cut by the tooth 312 are advanced downward, as described in greater detail below. A rear surface 344 of the inner wall 340 is inclined or sloped such that food is guided from the upper surface 58 of the carrier disk 40, through the support disk 60, and out the slot 328. The magnitude of the angle or slope of the rear surface 344 defining the channel 90 is selected such that the cut food items are guided smoothly out of the slot 328.

Figure 6:
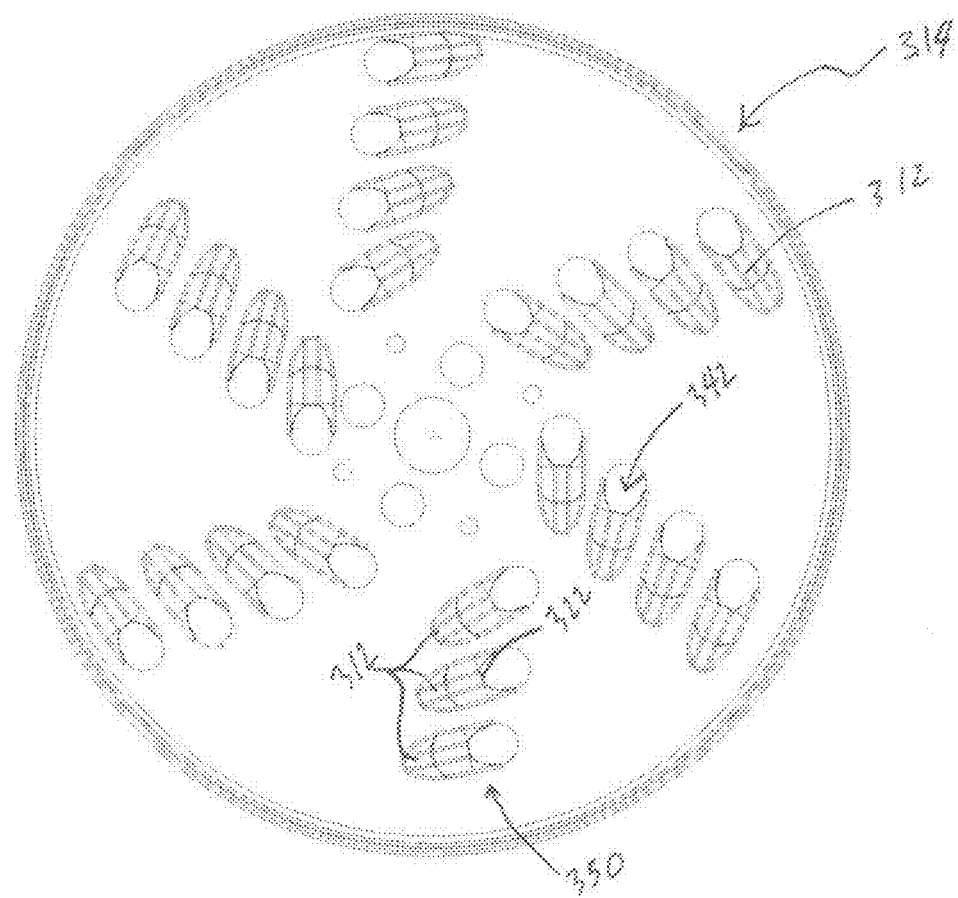
FIG. 6 is a top plan view of the lower plate of FIG. 5.

As shown in FIG. 6, the cutting teeth 312 are arranged in a number of staggered rows 350 that correspond to the staggered rows 54 defined in the upper plate 32. Each staggered row 350 is positioned along a radial line 94 extending outwardly from the center 96 of the body 62 of the support disk 314. Within each row 350, a gap 98 is defined between the tips 336 of adjacent teeth 312. In the illustrative embodiment, the magnitude of each gap 98 is substantially equal such that the teeth 36 in each row 92 are equally spaced apart. In other embodiments, the teeth may be arranged in a number of curved rows that sweep forward or backward. In still other embodiments, the teeth may be dispersed asymmetrically over the support disk. In other embodiments, the gaps defined between the tips of adjacent cutting teeth may be different or asymmetrical so that no gap is equal to any other gap.

Returning to FIG. 2, the upper plate 32 and the lower plate 34 are coupled together via a central hub 38 of the assembly 30. The central hub 38 may include a collar 112 and a central plate 114 that are secured to the upper plate 32. The collar 112 includes a platform 116 positioned below the plates 32, 34 and a cylindrical body 118 that extends downwardly of the platform 116. The cylindrical body 118 has a pair of slots 120 defined therein. Each slot 120 includes a vertical section 122 that extends upwardly from a lower end 124 of the body 118 and a horizontal section 126 that is connected to the vertical section 122.

The platform 116 has an upper surface 130, and the collar 112 a plurality of posts 132 that extend upwardly from the upper surface 130. Each post 132 is arranged circumferentially around a central bore 134 defined in the upper surface 130. As illustrated, each post 132 has a cylindrical outer surface 136 and a circular top surface 138. It should be appreciated that each post may have a number of substantially planar outer surfaces. Alternatively, the number of posts may be greater or fewer.

The posts 132 extend through openings 139 defined in the lower plate 34 and through holes 166 in frame 162 to upper ends 140, as described in detail below. At the upper end 140, each post 132 is secured to the central plate 114 of the hub 38, thereby joining the collar 112 with the central plate 114. As shown in FIG. 2, the central plate 114 is positioned above the upper surface 58 of the upper plate 32. The central plate 114 includes a cylindrical body 142 and a lower flange 144 that extends outwardly from the body 142. It should be appreciated that the central plate may also include an ergonomic grip that a user may grasp to carry the cutting disk assembly 30.

The central plate 114 has a central bore 146 that extends downwardly from the upper surface 148 of the body 142, which is axially aligned with the bore 134 of the platform, the central bore 64 of the support disk 60, and the central bore 44 of the carrier disk 40. In that way, the bores 44, 64, 134, and 146 define a passageway (not shown) through the assembly 30. The flange 144 includes a plurality of ears 152 that correspond to the posts 132 of the collar 112, and each ear 152 is secured to a corresponding post 132 via a fastener 154.

As illustrated, the fasteners 154 are screws that pass through holes 156 defined in the ears 152 and are threaded into apertures 158 defined in the top surfaces 138 of the posts 132. As shown in FIG. 2, each fastener 154 also passes through a hole 160 defined in the carrier disk 40 of the upper plate 32 such that the carrier disk 40 is clamped between the posts 132 of the collar 112 and the central plate 114.

The central hub 38 of the assembly 30 may also include a frame 162 having a support plate 164 positioned between the disk 60 of the lower plate 34 and the platform 116 of the collar 112. The frame 162 and the collar 112 of the central hub 38 may be configured to slide relative to one another. In the illustrative embodiment, the plate 164 has a plurality of cylindrical bores 166 defined therein, which are sized to receive the posts 132 of the collar 112. As such, the posts 132 may slide along the bores 166 when the frame 162 is moved upwardly and downwardly relative to the collar 112 or the collar 112 is moved upwardly and downwardly relative to the frame 162.

The support plate 164 may be secured to the lower plate 34 via a number of fasteners 168. As illustrated, the fasteners 168 are screws that pass through holes 170 defined in the support disk 60 of the lower plate 34 and are threaded into apertures 172 defined in the upper surface 174 of the support plate 164. Because a user may remove the fasteners 154, 168 (i.e., the screws) securing the upper plate 32 and the lower plate 34 to the central hub 38, the upper plate 32 is removable coupled to the lower plate 34. Alternatively, one or both sets of fasteners may be omitted and the upper plate may be removably coupled to the lower plate through known fastening mechanisms.

Figure 9:
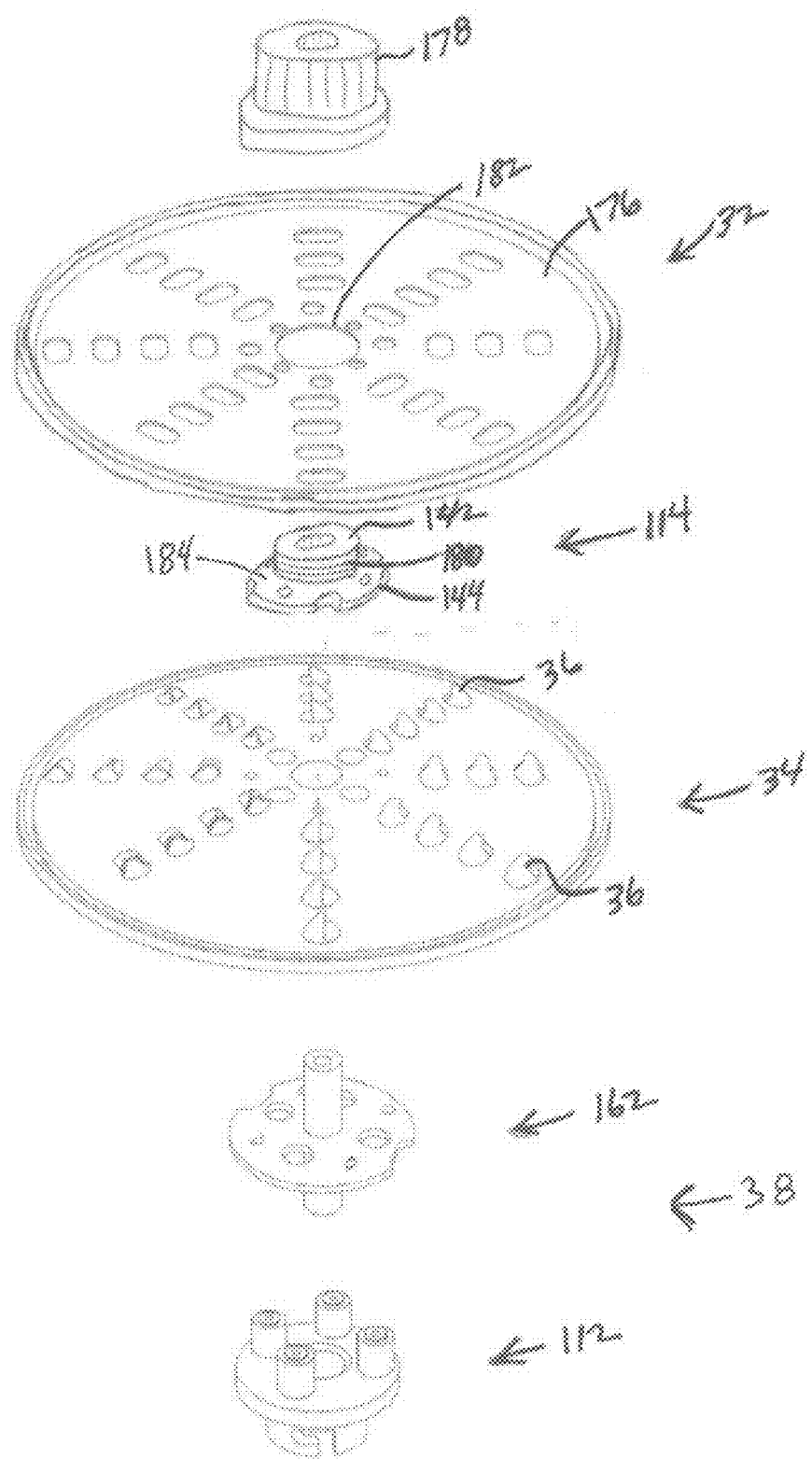
FIG. 9 is an exploded perspective view of an alternative adjustable cutting tool assembly.

For example, as shown in FIG. 9, the upper plate 32 may include a carrier disk 176 that is positioned above the lower flange 144 of the central plate 114. The assembly 30 may also include an internally-threaded knob 178 that engages a plurality of external threads 180 formed on the cylindrical body 142. The carrier disk 176 may have a central opening 182 sized to receive the cylindrical body 142 such that the carrier disk 176 may slide along the body 142 to engage the upper surface 184 of the lower flange 144 of the central plate 114. The carrier disk 176 may then be clamped between the upper surface 184 of the lower flange 144 and the knob 178.

The cutting disk assembly 30 may include a detent secured to the carrier disk 176 that may be configured to engage one or more teeth defined in the central hub. The upper plate 32 and the lower plate 34 may be fixed together such that the plates 32, 34 cannot be separated during normal operation.

Returning to FIG. 2, the frame 162 of the central hub 38 may have an upper central shaft 186 that extends upwardly from the support plate 164 and a lower central shaft 188 that extends downwardly from the support plate 164. A passageway 190 may extend through the shafts 186, 188 and the support plate 164. The lower shaft 188 may have a socket 192 defined therein keyed to match the upper end 194 of a drive stem 196 (see FIG. 10). As illustrated, the upper end 194 of the stem 196 includes two flat surfaces (not shown) connected at each end by a curved surface (not shown), and the socket 192 has a corresponding geometric shape that is sized to receive the upper end 194 of the stem 196. When the cutting disk assembly 30 is seated on the drive stem 196, as shown in FIG. 11, the keyed upper end 194 of the stem 196 is received in the socket 192 of the central shaft 188.

It should be appreciated that the arrangement of the socket 192 and keyed end 194 may be reversed, with the keyed end 194 being formed on the central shaft 188 and the socket being defined in the drive stem 196. It should also be appreciated that other methods of attachment may be used to secure the drive stem to the cutting assembly. For example, a pair of tabs (not illustrated) may extend from the upper end of the drive stem 196, and those tabs may be received in a corresponding socket defined in the central shaft 188.

As described above, the collar 112 of the central hub 38 may be movable relative to the frame 162 of the central hub 38. Because the upper plate 32 is secured to the collar 112 and the lower plate 34 is secured to the frame 162, movement of the collar 112 or the frame 162 causes movement of the plates 32, 34 and hence movement of the cutting teeth 36 relative to the carrier disk 40. As shown in FIG. 11, a vertical distance, D, is defined between the top edge 76 of the cutting edge 72 of each cutting tooth 36 and the upper surface 58 of the carrier disk 40. The distance D defines a cutting thickness of food items processed by the cutting disk assembly 30. In other words, the thickness of the pieces of food items cut by the food processor 10 is determined by the distance D between the top edge 76 of the cutting edge 72 of each cutting tooth 36 and the upper surface 58 of the carrier disk 40. As the distance D between the top edges 76 of the cutting edges 72 of the cutting teeth 36 and the upper surface 58 of the carrier disk 40 increases, thicker pieces of food items are created; while thinner pieces of food items are created when the distance D between the top edges 76 of the cutting edges 72 and the upper surface 58 of the carrier disk 40 decreases. As described in greater detail below, the food processor 10 includes a thickness adjustment assembly 198 that may be operable by a user to adjust the distance D to vary the cutting thickness of the food processor 10 while the cutting disk assembly 30 is driven by the motor 14.

Figure 10:
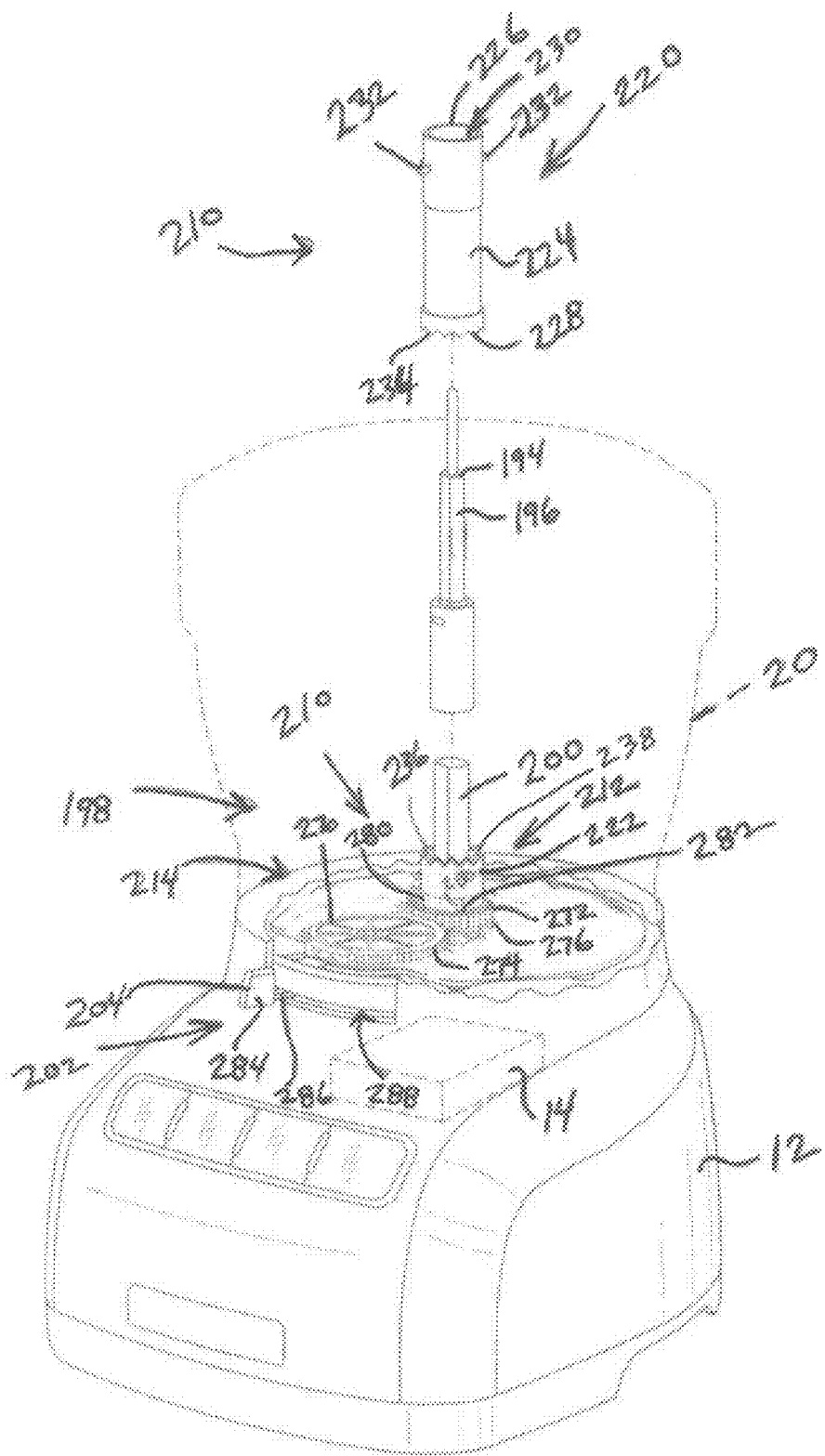
FIG. 10 is an exploded, partial cross-sectional perspective view of the food processor of FIG. 1.

Referring now to FIG. 10, the food processor 10 includes the motor 14 that is configured to rotate the cutting disk assembly 30. The motor 14 includes an output shaft 200 extending upwardly from the base 12. The output shaft 200 is coupled to the drive stem 196, which is in turn coupled to the cutting disk assembly 30 as described above. As such, rotation of the output shaft 200 causes rotation of the cutting disk assembly 30.

The thickness adjustment assembly 198 of the food processor 10 is operable by a user to vary the cutting thickness of the food processor 10 while the cutting disk assembly 30 is driven by the motor 14, thereby creating thicker or thinner pieces of cut food items during a cutting operation. The adjustment assembly 198 may include a user-operated control device 202 that is located outside of the processing chamber 26 defined by the bowl 20 and the lid 22. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting disk assembly 30 is driven by the motor 14.

For example, as illustrated and described herein, the external control device 202 is embodied as a control lever 204 that extends outwardly from the base 12 and is moveable relative to the base 12 to change the cutting thickness of the cutting disk assembly 30 without removing the lid 22 from the bowl 20. In such a configuration, the user moves the control lever 204 one direction or the other to change (i.e., increase or decrease) the distance D between the top edges 76 of the cutting teeth 36 and the upper surface 58 of the carrier disk 40. In the illustrative embodiment, the thickness adjustment assembly is manually operated by the user-operated control device, but it should be appreciated that in other embodiments the adjustment assembly may be electrically-operated, including, for example, a motor, an electronic controller, and sensors such that the thickness adjustment assembly may be operated automatically. It should also be appreciated that other user-operated control devices, such as knobs, dials, buttons, servo-motors, or the like, may be substituted for the control lever 204.

The adjustment assembly 198 may include a two-piece adaptor 210 coupled to the collar 112 of the central hub 38 of the cutting disk assembly 30, a lift device 212 supporting the adaptor 210, and a gear assembly 214 positioned in the base 12. Merely by way of example, the adjustment assembly is shown and described in PCT International Patent Application No. PCT/CN2011/000311, which was filed on Feb. 25, 2011 and is expressly incorporated herein by reference. Other exemplary embodiments of an adjustment assembly are shown and described in PCT International Patent Application No. PCT/CN2011/001487, which was filed on Sep. 1, 2011 and is expressly incorporated herein by reference.

As shown in FIG. 10, the adaptor 210 includes an upper shaft 220 secured to the collar 112 of the cutting disk assembly 30 and a lower shaft 222 rotatively coupled to the lift device 212. The upper shaft 220 has a cylindrical body 224 that extends from an upper end 226 to a lower end 228. The shaft 220 of the adaptor 210 also has a passageway 230 that extends through the body 224. When assembled, the shaft 220 is positioned over the drive stem 196 and the lower end of the central shaft 188 of the cutting disk assembly 30 such that the stem 196 and shaft 188 are received in the passageway 230.

The upper end 226 of the upper shaft 220 has a pair of tabs 232 extending outwardly therefrom. Each tab 232 is positioned in a corresponding slot 120 defined in the collar 112, thereby securing the upper shaft 220 of adaptor 210 to the cutting disk assembly 30 such that rotation of the cutting disk assembly 30 causes rotation of the upper shaft 220. As shown in FIG. 10-11, the lower shaft 222 of the adaptor 210 is torsionally secured to the lower end 228 of the shaft 220 such that the rotation of the upper shaft 220 causes rotation of the lower shaft 222. As illustrated, a plurality of teeth 234 are formed at the lower end 228 of the shaft 220, and a corresponding plurality of teeth 236 are formed at an upper end 238 of the lower shaft 222. When the adaptor 210 is assembled, the teeth 236 of the lower shaft 222 are interdigitated with the teeth 234 of the upper shaft 220, thereby securing the shafts 220, 222 together. Alternatively, it will be appreciated that a combination of pins and slots as well as other fastening means may be used to torsionally secure the shaft 220 to the shaft 222.

As shown in FIG. 11, the adaptor 210 includes a biasing mechanism 240 configured to bias the upper shaft 220 into engagement with the lower shaft 222. The biasing mechanism 240 includes a sleeve 242 that is positioned in the passageway 230 and a biasing element, such as a spring 244. The sleeve 242 has the drive stem 196 of the food processor 10 extending therethrough.

The sleeve 242 contacts the central shaft 188 of the cutting disk assembly 30. The sleeve 242 has a flange 248 that extends outwardly from its upper end. Similarly, the upper shaft 220 includes an inner flange 250 extending inwardly into the passageway 230. The spring 244 is positioned between the flanges 248, 250 and urges the shaft 220 downward to maintain engagement between the teeth 234, 236 such that the shafts 220, 222 remain coupled together. The sleeve 242 also includes a lip 252 configured to engage the flange 250 when the upper shaft 220 not assembled with the cutting disk assembly 30.

As described above, the thickness adjustment assembly 198 also includes a lift device 212 operable to move the adaptor 210 (and hence carrier disk 40) upwardly and downwardly relative to the base 12 of the food processor. As shown in FIG. 11, the lift device 212 includes a screw-type drive assembly having an internally-threaded upper sleeve 260 engaged with an externally-threaded lower sleeve 262. The lower sleeve 262 is secured to the base 12 such that the sleeve 262 does not rotate. In use counter-clockwise rotation of the upper sleeve 260 may cause downward movement of the upper sleeve 260, while clockwise rotation of the upper sleeve 260 may cause upward movement of the upper sleeve 260.

The lower shaft 222 of the adaptor 210 is rotatively coupled to the upper sleeve 260 of the lift device 212 via a bearing 264. In that way, the shaft 222 (and hence cutting disk assembly 30) is permitted to rotate relative to the lift device 212. At the same time, the bearing 264 fixes the axial position of the shaft 222 relative to the upper sleeve 260 such that upward and downward movement of the upper sleeve 260 causes upward and downward movement of the shaft 222.

As described above and shown in FIG. 10, the thickness adjustment assembly 198 also includes a gear assembly 214, which is positioned in the base 12 of the food processor 10. The gear assembly 214 includes a drive gear 270 and a guide gear 272 that are pivotally coupled to the base 12. Each of the gears 270, 272 is an external gear having a plurality of teeth 274, 276 that are interdigitated such that rotation of the drive gear 270 causes rotation of the guide gear 272.

The upper sleeve 260 of the lift device 212 is movably coupled to the guide gear 272. As shown in FIG. 10, the upper sleeve 260 has a plurality of grooves 280 defined therein, and the guide gear 272 has a corresponding plurality of splines 282 that are received in the grooves 280. The splines 282 and the grooves 280 cooperate to couple the sleeve 260 to the guide gear 272 while permitting the sleeve 260 to translate upwardly and downwardly relative to the gear 272. As such, rotation of the guide gear 272 by the drive gear 270 causes rotation of the upper sleeve 260 relative to the lower sleeve 262, thereby causing movement of the upper sleeve 260 upwardly or downwardly relative to the base 12.

As described above, the thickness adjustment assembly 198 includes a control lever 204 that extends outwardly from the base 12 of the food processor 10. As illustrated, the control lever 204 has a grip 284 spaced apart from the base 12 and an arm 286 that extends from the grip 284 into the base 12 through a slot 288. The arm 286 is coupled to the drive gear 270 within the base 12 such that movement of the control lever 204 along the slot 288 causes rotation of the drive gear 270, thereby operating the thickness adjustment assembly 198 to change the cutting thickness of the cutting disk assembly 30.

Referring now to FIGS. 11 and 12, the removable lid 22 is configured to be secured to a rim 290 of the bowl 20. The lid 22 of the food processor 10 has an inner surface 292 and a sleeve 294 that extends downwardly from the inner surface 292 thereof. The sleeve 294 has an aperture 296 defined in a lower end 298 thereof, which is sized to receive a tip 300 of the drive stem 196.

In use, the user may attach the lid 22 to the upper rim 290 of the bowl 20. To do so, the user aligns the sleeve 294 of the lid 22 with the tip 300 of the drive stem 196. The user then advances the lid 22 downward such that the lower end 298 of the sleeve 294 engages the upper end 302 of the frame 162 of the central hub 38. As the user continues to advance the lid 22 downward, the bias exerted by the spring 244 of the adaptor 210 is overcome, and the cutting teeth 36 are moved downward such that the distance D defined between the top edges 76 of the cutting edges 72 of the teeth 36 and the upper surface 58 of the carrier disk 40 is decreased. As shown in FIG. 11, when the lid 22 contacts the upper rim 290 of the bowl 20, the distance D defined between the top edges 76 of the cutting edges 72 of the teeth 36 and the upper surface 58 of the carrier disk 40 is relatively minimal, corresponding to the minimal cutting thickness of the cutting disk assembly 30.

In use, a user operates the controls 18 to energize the motor 14 to rotate the output shaft 200 and the drive stem 196 attached thereto. Because the cutting disk assembly 30 is secured to the drive stem 196, rotation of the output shaft 200 causes rotation of the cutting disk assembly 30. While the motor 14 is energized, the user may advance food items into the processing chamber 26 through the feed tube 24 to be cut by the cutting disk assembly 30.

If the user desires to change the cutting thickness during the cutting operation, the user may grasp the grip 284 and advance the control lever 204 along the slot 288. Movement of the control lever 204 causes the control lever 204 to operate the gear assembly 214 to rotate the guide gear 272. As described above, rotation of the guide gear 272 causes rotation of the upper sleeve 260 relative to the lower sleeve 262 and moves the upper sleeve 260 downwardly relative to the base 12. Because the adaptor 210 is secured to both the upper sleeve 260 and the carrier disk 40 of the upper plate 32, movement of the upper sleeve 260 causes movement of the disk 40 relative to the cutting teeth 36, thereby increasing the distance D defined between the top edges 76 of the cutting edges 72 of the cutting teeth 36 and the upper surface 58 of the carrier disk 40. As shown in FIG. 12, the distance D is relatively larger than the distance D shown in FIG. 11, indicating that thicker food items will be produced by the food processor 10.

As described above, the cutting teeth 36 cooperate to define a region 52 of the carrier disk 40 in which food items may be cut by the cutting tool 16. The cutting teeth 36 are arranged over the carrier disk 40 such that a consistent amount is removed from a food item with each rotation of the cutting disk assembly 30 in each of the cutting positions. In other words, the cutting teeth 36 are arranged such that the cutting edges 72 of the teeth 36 overlap when the distance D defined between the top edges 76 of the cutting edges 72 of the teeth 36 and the upper surface 58 of the carrier disk 40 is relatively minimal or at a maximum. In that way, the entire surface of a food item advanced into the processing chamber 26 is cut by the teeth 36.

Figure 13A:
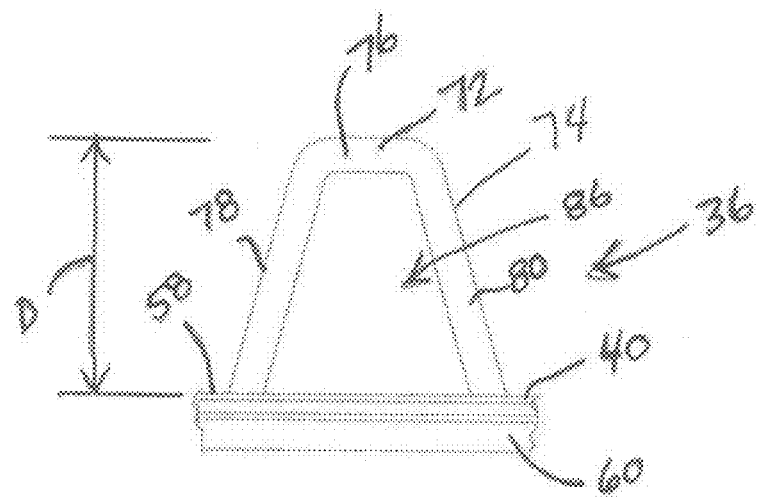
FIG. 13A is a cross-sectional elevation view of a cutting tooth and a planar disk of the adjustable cutting tool positioned in one cutting position.
Figure 13B:
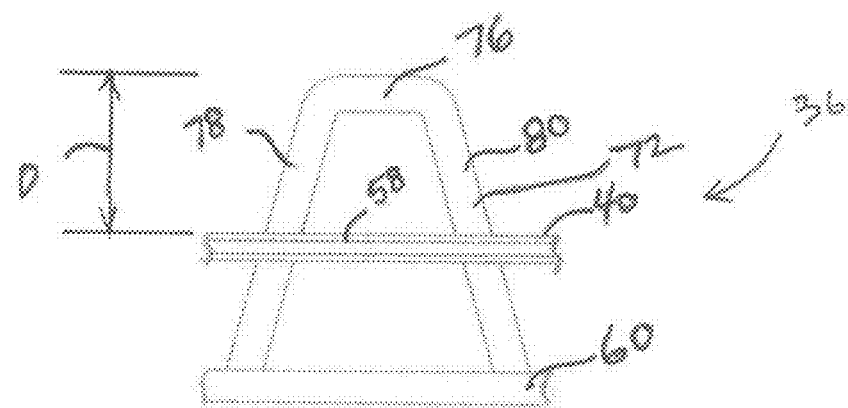
FIG. 13B illustrates the cutting tooth of FIG. 13A and the planar disk of the adjustable cutting tool positioned in another cutting position.
Figure 13C:
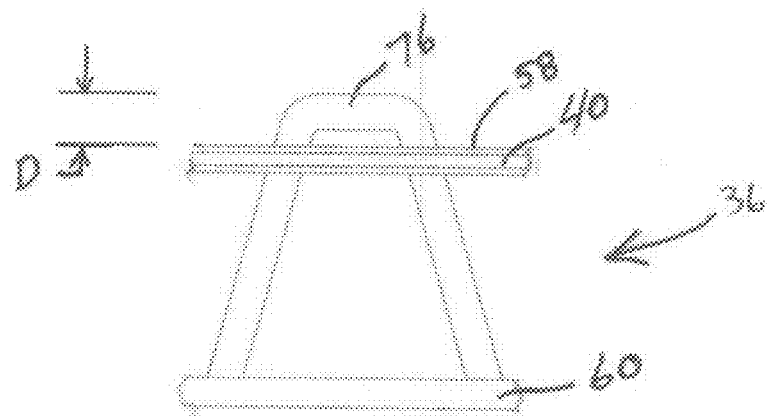
FIG. 13C illustrates the cutting tooth of FIG. 13A and the planar disk of the adjustable cutting tool positioned in another cutting position.

Further, as shown in FIGS. 13A-13C, the cross-sectional area of the opening 86 defined by the cutting edge 72 of each tooth 36 changes by a proportional amount between cutting positions. Further, because the side sections 78, 80 of the cutting edge 72 are substantially straight, the cutting size varies linearly from the minimum cutting thickness to the maximum cutting thickness.

Figure 14A:
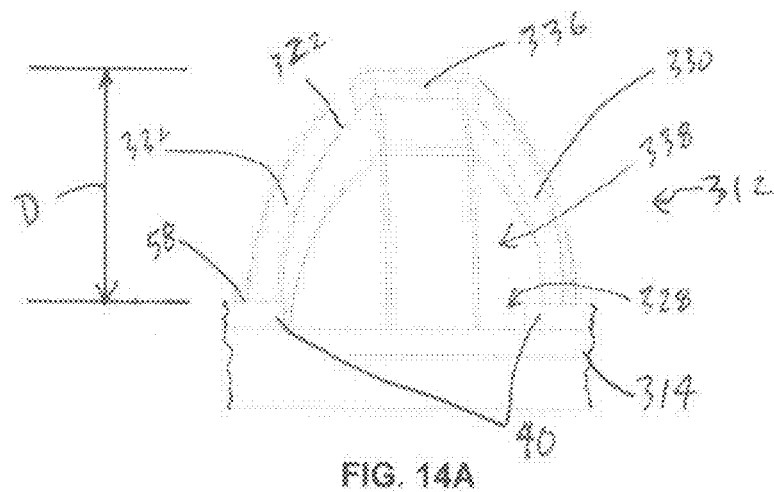
FIG. 14A is a cross-sectional elevation view of an alternative cutting tooth and a planar disk of the adjustable cutting tool positioned in one cutting position.
Figure 14B:
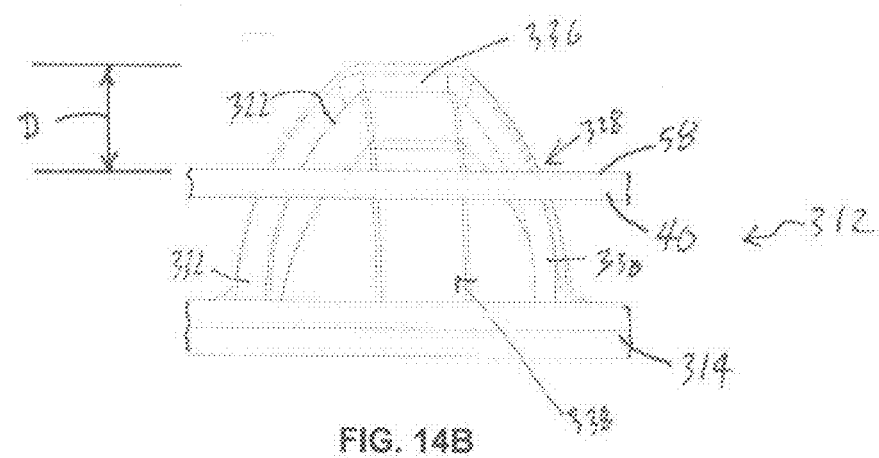
FIG. 14B illustrates the alternative cutting tooth of FIG. 14A and the planar disk of the adjustable cutting tool positioned in another cutting position.
Figure 14C:
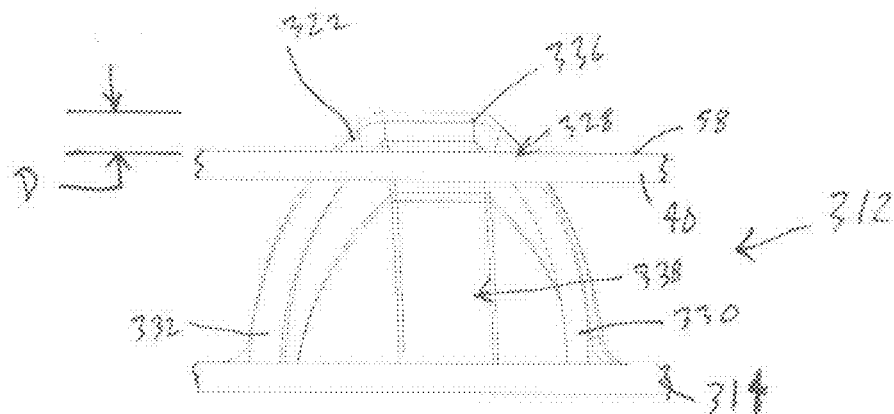
FIG. 14*c* illustrates the alternative cutting tooth of FIG. 14A and the planar disk of the adjustable cutting tool positioned in another cutting position.

Alternatively, FIGS. 14A-14C illustrate the cross-sectional area of the opening 328 defined by the cutting edge 336 of each tooth 312 changes by a proportional amount between cutting positions. Further, because the side sections 330, 332 of the cutting edge 336 are substantially curved, the cutting size varies non-linearly from the minimum cutting thickness to the maximum cutting thickness. Additionally, it is understood that the cross sectional area of the opening 328 may be defined by side sections 330, 332 of cutting edges 336 and the carrier disk 40 that are variably curved in both convex and concave form (not shown) indicating that processed food having a desirable non-uniform cross section will be produced by the food processor 10. The desirability of processed food with non-uniform cross section can be appreciated for both the unique appearance the processed food provides to users and for the increased cross sectional surface area of the processed food that may aid users in subsequent steps in food preparation, as in the examples of desirably melting or cooking the processed food.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while the thickness adjustment assembly in the illustrative embodiment moves the carrier disk relative to the cutting teeth, in other embodiments the assembly may move the cutting teeth relative to the carrier disk. Additionally, while the cutting tool 16 is illustrated herein as an adjustable cutting disk assembly, it should be appreciated that in other embodiments the cutting tool may be an adjustable ice shaver or other adjustable cutting device. Further, while the food processor 10 is herein illustrated as a conventional domestic food processor, the features and aspects disclosed herein can also be implemented in other types of food processing devices such as automatic food slicers, dicers, ice shavers and the like. Further, in other embodiments, the adjustable cutting disk assembly may include a thickness adjustment assembly that is integrated with the disk assembly. In such embodiments, the thickness adjustment assembly may include an externally-operated user control device or control device that requires the adjustable cutting disk assembly to be removed from the bowl for adjustment.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure.

The invention claimed is:

1. A cutting assembly for a food processing device, comprising:
 a first disk member having a planar body portion with plurality of slots disposed therethrough and an upper surface;
 a second disk member having a plurality of cutting teeth that extend through the plurality of slots defined in the first disk member, each cutting tooth having a cutting edge that defines an opening in the cutting tooth;
 an adjustment assembly operably coupled to the first disk member for adjusting a vertical position of the first disk member relative to the second disk member; and
 wherein (i) the cutting edge of each cutting tooth has a tip positioned above the upper surface of the first disk member, (ii) a distance is defined between the upper surface of the first disk member and the tip, and (iii) vertical movement of the first disk member adjusts the distance between the upper surface of the first disk member and the tip to produce cut food items of varying thicknesses.

2. The cutting assembly of claim 1, wherein the cutting edge of each cutting tooth includes a first section extending downwardly from the tip to define a first side of the opening and a second section extending downwardly from the tip to define a second side of the opening.

3. The cutting assembly of claim 2, wherein the opening of each cutting tooth is a trapezoidal-shaped opening.

4. The cutting assembly of claim 2, wherein the opening of each cutting tooth is a rectangular-shaped opening.

5. The cutting assembly of claim 1, wherein each cutting tooth has an inner wall that extends inwardly from the opening to define a channel extending downwardly through the second disk member.

6. The cutting assembly of claim 1, wherein the cutting teeth are arranged in a number of staggered rows, each staggered row of cutting teeth being positioned along a radial line extending outwardly from the center of the second disk member.

7. The cutting assembly of claim 1, wherein the second disk member is removably coupled to the first disk member.

8. The cutting assembly of claim 1, further comprising:
 a hub secured to the first disk member, the hub having a base and a platform formed at an upper end of the base,
 wherein the second disk member is positioned between the platform of the hub and the first disk member.

9. The cutting assembly of claim 1, wherein each slot has an oblong-shaped opening in the upper surface of the first disk member.

10. A food processing device comprising:
 a base having a motor positioned therein,
 a removable bowl coupled to the base, a removable lid coupled to the bowl so as to define a processing chamber, the lid having a feed tube that opens into the bowl, a cutting assembly positioned in the processing chamber and driven by the motor to cut food items advanced through the feed tube, the cutting assembly including (i) a support disk having a plurality of cutting teeth, each cutting tooth having a tip, (ii) a planar disk disposed above the support disk and having a plurality of slots and an upper surface, the planar disk being upwardly and downwardly moveable relative to the cutting teeth of the support disk to adjust a distance defined between each tip of the cutting teeth and the upper surface of the planar disk to produce food items of varying thicknesses, wherein the cutting teeth of the support disk extend through the plurality of slots defined in the planar disk, and an adjustment assembly including a lever extending outwardly from the base, the lever being operable to move one of the planar disk and the support disk relative to each other, wherein the cutting assembly is driven by the motor.

11. The food processing device of claim 10, wherein each cutting tooth has a cutting edge that defines an opening in the cutting tooth.

12. The food processing device of claim 10, further comprising a drive stem coupled to an output shaft of the motor and the support disk.

13. The food processing device of claim 12, further comprising an adaptor removably coupled to the planar disk, wherein:
the adjustment assembly further comprises a drive assembly coupled to the adaptor and the lever,
movement of the lever in a first direction causes the drive assembly to move the planar disk downward relative to the cutting teeth, and
movement of the lever in a second direction causes the drive assembly to move the planar disk upward relative to the cutting teeth.

14. A food processing device comprising:
a base having a motor positioned therein,
a removable bowl coupled to the base,
a removable lid coupled to the bowl so as to define a processing chamber, the lid having a feed tube that opens into the bowl,
a cutting assembly positioned in the processing chamber and driven by the motor to cut food items advanced through the feed tube, the cutting assembly including (i) a planar disk having an upper surface with a plurality of slots disposed thereon, (ii) a support disk positioned below the planar disk, the support disk having a plurality of cutting teeth extending upwardly through the plurality of slots of the planar disk, and
an adjustment assembly coupled to the cutting assembly, the adjustment assembly including a user-operated control device positioned outside of the processing chamber for vertically moving the support disk relative to the planar disk,
wherein (i) each cutting tooth has a tip positioned above the upper surface of the planar disk, (ii) one of the support disk and the planar disk is moveable to adjust a distance defined between each tip of the cutting teeth and the upper surface of the planar disk to produce food items of varying thicknesses, and (iii) the user-operated control device is operable to move the one of the support disk and the planar disk while the cutting assembly is driven by the motor.

15. The food processing device of claim 14, wherein the user-operated control device is a lever extending outwardly from the base, the lever being operable to move the support disk while the cutting assembly is driven by the motor.

16. The food processing device of claim 14, wherein each cutting tooth has a cutting edge that defines an opening in the cutting tooth.

17. The food processing device of claim 16, wherein:
the processing chamber has an upper compartment and a lower compartment, and
each cutting tooth has an inner wall that extends inwardly from the opening to define a channel extending downwardly through the support disk to advance food items cut by the cutting tooth from the upper compartment to the lower compartment.

18. The food processing device of claim 16, wherein the opening of each cutting tooth is a trapezoidal-shaped opening.

* * * * *